(12) United States Patent
Pan et al.

(10) Patent No.: US 11,716,746 B2
(45) Date of Patent: Aug. 1, 2023

(54) SCHEDULING AND TRANSMISSION FOR NOMA

(71) Applicant: InterDigital Patent Holdings, Inc., Wilmington, DE (US)

(72) Inventors: Kyle Jung-Lin Pan, Saint James, NY (US); Robert L. Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/970,032

(22) PCT Filed: Feb. 12, 2019

(86) PCT No.: PCT/US2019/017622
§ 371 (c)(1),
(2) Date: Aug. 14, 2020

(87) PCT Pub. No.: WO2019/160849
PCT Pub. Date: Aug. 22, 2019

(65) Prior Publication Data
US 2021/0100002 A1    Apr. 1, 2021

Related U.S. Application Data

(60) Provisional application No. 62/630,644, filed on Feb. 14, 2018.

(51) Int. Cl.
*H04W 72/04* (2023.01)
*H04L 1/16* (2023.01)
(Continued)

(52) U.S. Cl.
CPC ........... *H04W 72/53* (2023.01); *H04L 1/0057* (2013.01); *H04L 1/1614* (2013.01);
(Continued)

(58) Field of Classification Search
None
See application file for complete search history.

(56) References Cited

U.S. PATENT DOCUMENTS

| 2012/0224519 A1* | 9/2012 | Kwon | ................. H04B 7/0452 370/329 |
| 2013/0265955 A1* | 10/2013 | Kim | ..................... H04W 72/04 370/329 |

(Continued)

FOREIGN PATENT DOCUMENTS

| CN | 109586877 A | * 4/2018 |
| WO | 2016-180491 A1 | 11/2016 |

(Continued)

OTHER PUBLICATIONS

Author Unknown, Discussion on NoMA study for Rel-15 SI, Doc. No. R1-1720607, pp. 1-7, Dec. 1, 2017.*

(Continued)

*Primary Examiner* — Christopher M Crutchfield
(74) *Attorney, Agent, or Firm* — Condo Roccia Koptiw LLP

(57) ABSTRACT

Access, collision handling, and resolution for non-orthogonal multiple-access (NOMA) may be used. Fixed or dynamic group demodulation reference signal (DMRS) and multiple-access (MA) signature for NOMA retransmission may be used. A wireless transmit/receive unit (WTRU) may receive MAS information or DMRS information from a network entity. A WTRU may receive indication of the MAS information or DMRS information via a subgrouping-based scheme, a bitmap indication, or a binary threshold. A WTRU may receive an indication of a resource group size from the network entity. Based on the resource group size, the WTRU may determine whether the MAS information or the DMRS information is indicated via the subgrouping-based scheme or via the binary threshold scheme. The WTRU, based on
(Continued)

how the MAS information or the DMRS information is indicated, may determine a resource to be used for a NOMA transmission. The WTRU may send the NOMA transmission using the determined resource.

14 Claims, 10 Drawing Sheets

(51) Int. Cl.
*H04L 5/00* (2006.01)
*H04W 72/14* (2009.01)
*H04W 74/08* (2009.01)
*H04L 1/00* (2006.01)
*H04W 72/53* (2023.01)
*H04L 1/1607* (2023.01)
*H04W 72/044* (2023.01)
*H04W 72/23* (2023.01)

(52) U.S. Cl.
CPC .......... *H04L 5/0005* (2013.01); *H04L 5/0051* (2013.01); *H04W 72/0466* (2013.01); *H04W 72/23* (2023.01); *H04W 74/0833* (2013.01)

(56) References Cited

U.S. PATENT DOCUMENTS

| | | | |
|---|---|---|---|
| 2018/0183645 A1* | 6/2018 | Meng | H04L 5/00 |
| 2019/0045489 A1* | 2/2019 | He | H04W 72/12 |
| 2019/0132870 A1* | 5/2019 | Guey | H04W 74/085 |
| 2019/0182006 A1* | 6/2019 | Xiong | H04L 5/0094 |
| 2019/0342061 A1* | 11/2019 | Kim | H04W 72/0473 |
| 2020/0295882 A1* | 9/2020 | Wang | H04L 1/1812 |
| 2020/0322994 A1* | 10/2020 | Tian | H04W 76/27 |
| 2021/0152305 A1* | 5/2021 | Wei | H04L 5/0053 |

FOREIGN PATENT DOCUMENTS

WO 2017-209570 A1 12/2017
WO PCT/CN2018/07595 * 2/2018

OTHER PUBLICATIONS

Author Unknown, On the receiver design of grant-free MUSA, Doc. No. R1-1720221, pp. 1-8, Dec. 1, 2017.*
ITU-R Recommendation Sector of ITU, "IMT vision—framework and overall objectives of the future development of IMT for 2020 and beyond," Recommendation ITU-R M.2083-0, Sep. 2015, 21 pages.

* cited by examiner

| Index | Index | Index | Index | Index | | | | | | Index | Index | Index | Index |
|---|---|---|---|---|---|---|---|---|---|---|---|---|---|
| 0 | 1 | 2 | 3 | 4 | | | | | | N-5 | N-4 | N-3 | N-2 | N-1 |
| 0 | 0 | 1 | 1 | 0 | | | | | | 1 | 1 | 0 | 0 | 1 |

"1" Group B
"0" Group A

FIG. 4

N/M-bit Subgrouping Bitmap based Variable/Dynamic MA Group ness Machinermation Nos. 62/630,tion may be indicated to the WTRU, e.g., via a group common physical downlink control channel (GC-PDCCH).
SCHEDULING AND TRANSMISSION FOR NOMA

CROSS-REFERENCE TO RELATED APPLICATIONS

This application is the National Stage Entry under 35 U.S.C. § 371 of Patent Cooperation Treaty Application No. PCT/US2019/017622, filed Feb. 12, 2019, which claims the benefit of U.S. Provisional Patent Application Nos. 62/630,644, filed Feb. 14, 2018, the contents of which are incorporated by reference.

BACKGROUND

Enhanced Mobile Broadband (eMBB), Massive Machine Type Communications (mMTC) and Ultra Reliable and Low Latency Communications (URLLC) may be used for radio systems including new radio (NR) or fifth generation (5G) systems. Different use cases may focus on requirements such as massive connectivity, higher data rate, higher spectrum efficiency, low power and higher energy efficiency, lower latency and higher reliability. A wide range of spectrum bands ranging from 700 MHz to 80 GHz may be used for a variety of deployment scenarios. Different multiple access schemes may be utilized for the uplink and the downlink transmissions in NR or 5G systems. However, the multiple access schemes used utilized in such NR and 5G systems may have many shortcomings, for example, performance of such multiple access schemes as utilized in 5G systems may be limited by collisions and/or interference.

SUMMARY

Access, collision handling, and resolution for non-orthogonal multiple-access (NOMA) or 2-step RACH (or 2-step RACH procedure) may be used. Collision mitigation for NOMA or 2-step RACH may be used. Fixed group demodulation reference signal (DMRS) and multiple-access (MA) signature for NOMA retransmission may be used. Variable and dynamic group DMRS and MA signature may be used for NOMA retransmission.

A wireless transmit/receive unit (WTRU) for communicating in a NOMA wireless communication system may include a processor configured to receive MAS information or DMRS information from a network entity (e.g., a 5G network entity). The MAS information or the DMRS information may be indicated to the WTRU, e.g., via a group common physical downlink control channel (GC-PDCCH).

A WTRU may receive indication of the MAS information or DMRS information via a subgrouping-based scheme. For example, the WTRU may receive an indication of a plurality of subgroups, and receive resources associated with each of a plurality of subgroups. Each of the plurality of subgroups may comprise a respective plurality of resources. The MAS information or the DMRS information may be indicated via a number of bits equal to the number of subgroups.

A WTRU may receive indication of the MAS information or DMRS information via a bitmap indication. For example, the WTRU may receive resources associated with a first resource group, and resources associated with a second resource group via the bitmap indication.

A WTRU may receive indication of the MAS information or DMRS information via a binary threshold. For example, the WTRU may receive an indication of two groups. Each respective group may comprise at least a resource. Resources below the binary threshold may comprise a first group, and resources above the binary threshold may comprise a second group of the two groups.

A WTRU may receive an indication of a resource group size from the network entity. Based on the resource group size, the WTRU may determine whether the MAS information or the DMRS information is indicated via a subgrouping-based scheme or via a binary threshold scheme. For example, a number of bits used to indicate the MAS information or the DMRS information via the subgrouping-based scheme or the binary threshold for a number of resources may be less than a number of bits used to indicate the MAS information or the DMRS information via the bitmap indication for the same number of resources.

The WTRU, based on how the MAS information or the DMRS information is indicated, may determine a resource (e.g., an MAS, a DMRS, an index associated with an MAS, or an index associated with a DMRS) to be used for a NOMA transmission. The resource may belong to a resource group (e.g., a shared MAS group, an unshared MAS group, a shared DMRS group, or an unshared DMRS group). The resource group size, when the MAS information or the DMRS information is indicated via the subgrouping-based scheme, may be larger than the resource group size when the MAS info or the DMRS info is indicated via a bitmap indication.

Using the determined resource to be used for the NOMA transmission, the WTRU may send the NOMA transmission to a network entity (e.g., a 5G network entity).

BRIEF DESCRIPTION OF THE DRAWINGS

FIG. 4 illustrates an example of a bitmap based variable or dynamic MA resource group (e.g., MA signature/DMRS group) as provided in FIG. 3.

DETAILED DESCRIPTION

A detailed description of illustrative embodiments will now be described with reference to the various Figures.

Although this description provides a detailed example of possible implementations, it should be noted that the details are intended to be exemplary and in no way limit the scope of the application.

Figure 1A:
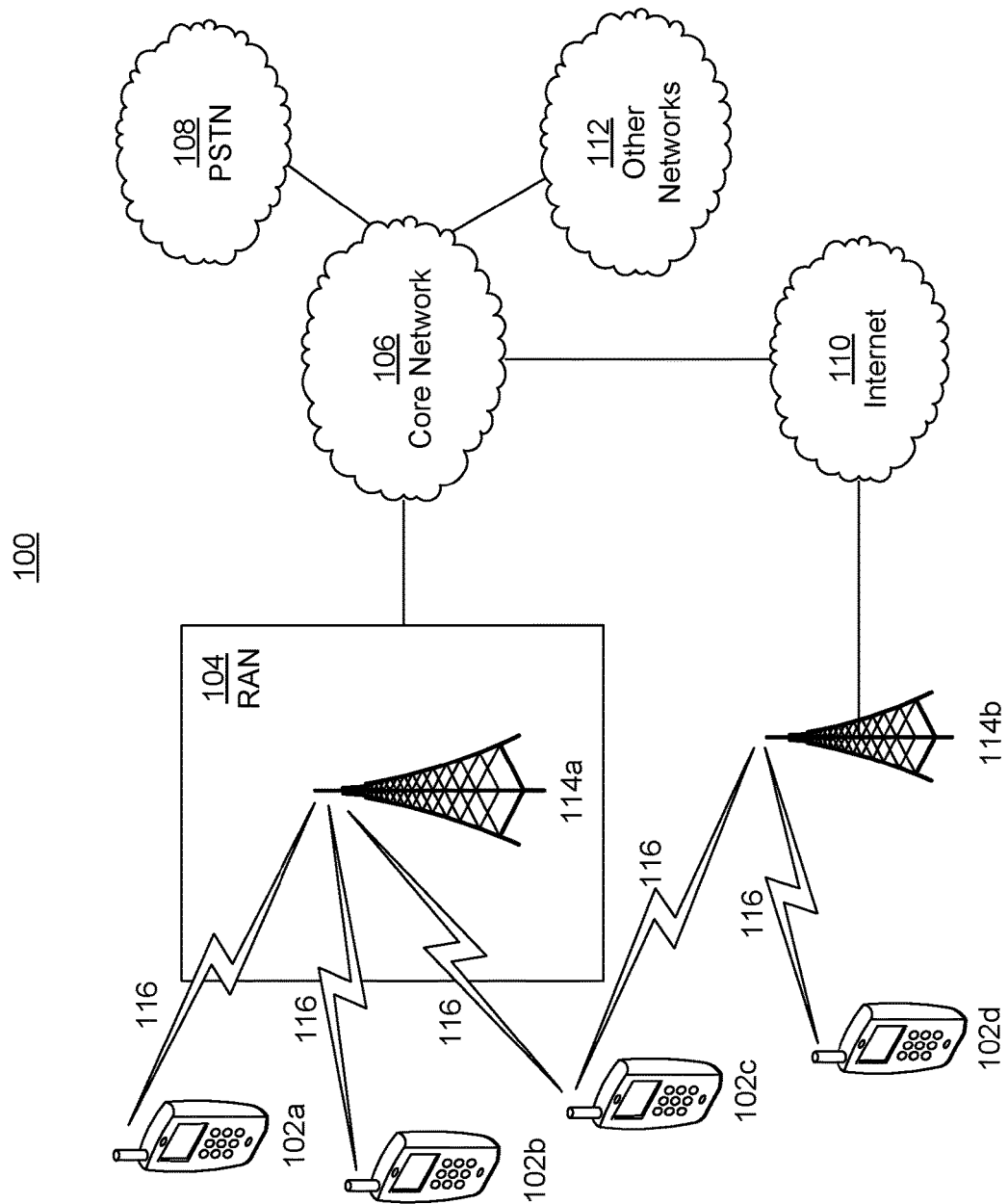
FIG. 1A is a system diagram illustrating an example communications system in which one or more disclosed examples may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
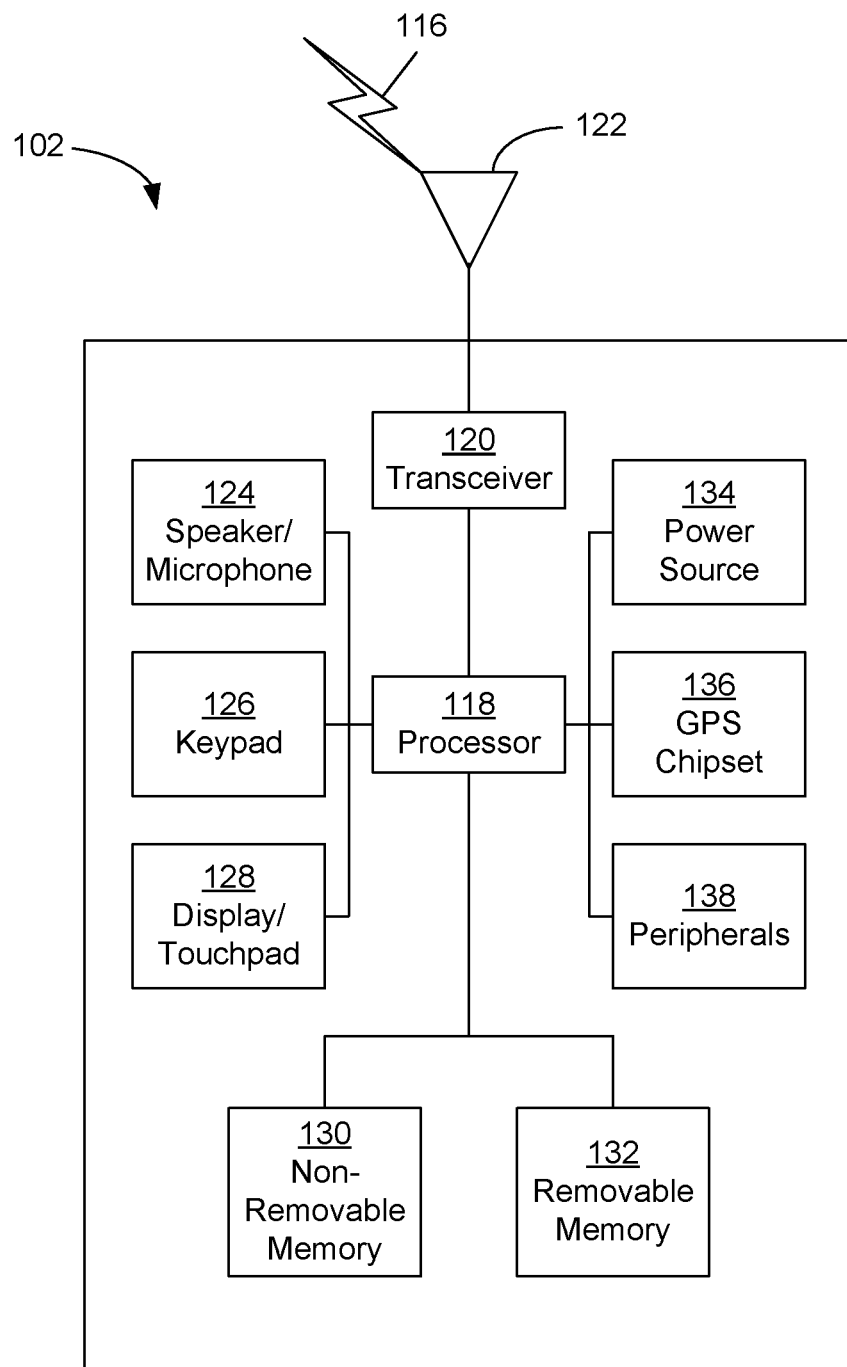
FIG. 1B is a system diagram illustrating an example wireless transmit/receive unit (WTRU) that may be used within the communications system illustrated in FIG. 1A according to an example.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
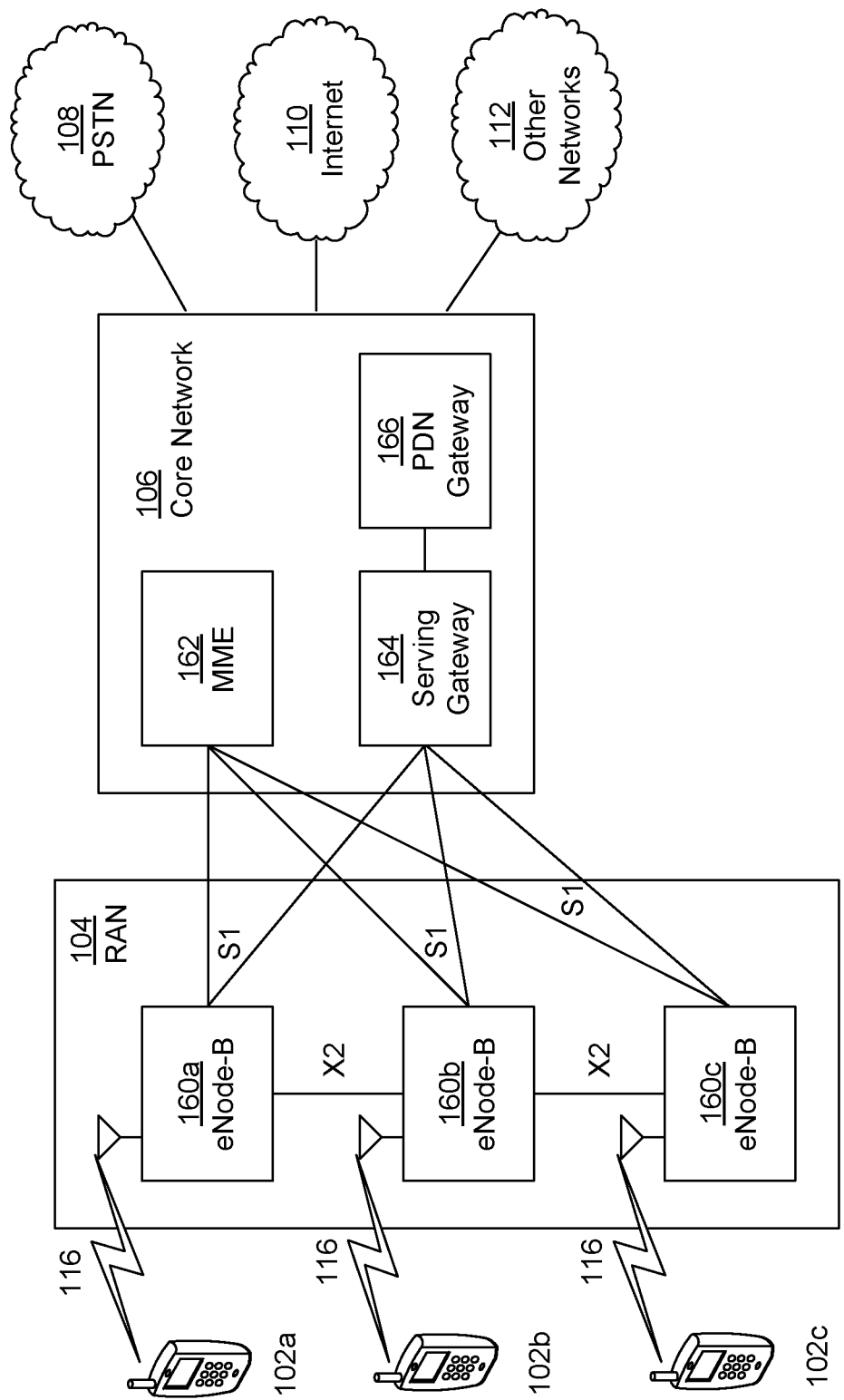
FIG. 1C is a system diagram illustrating an example radio access network (RAN) and an example core network (CN) that may be used within the communications system illustrated in FIG. 1A according to an example.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
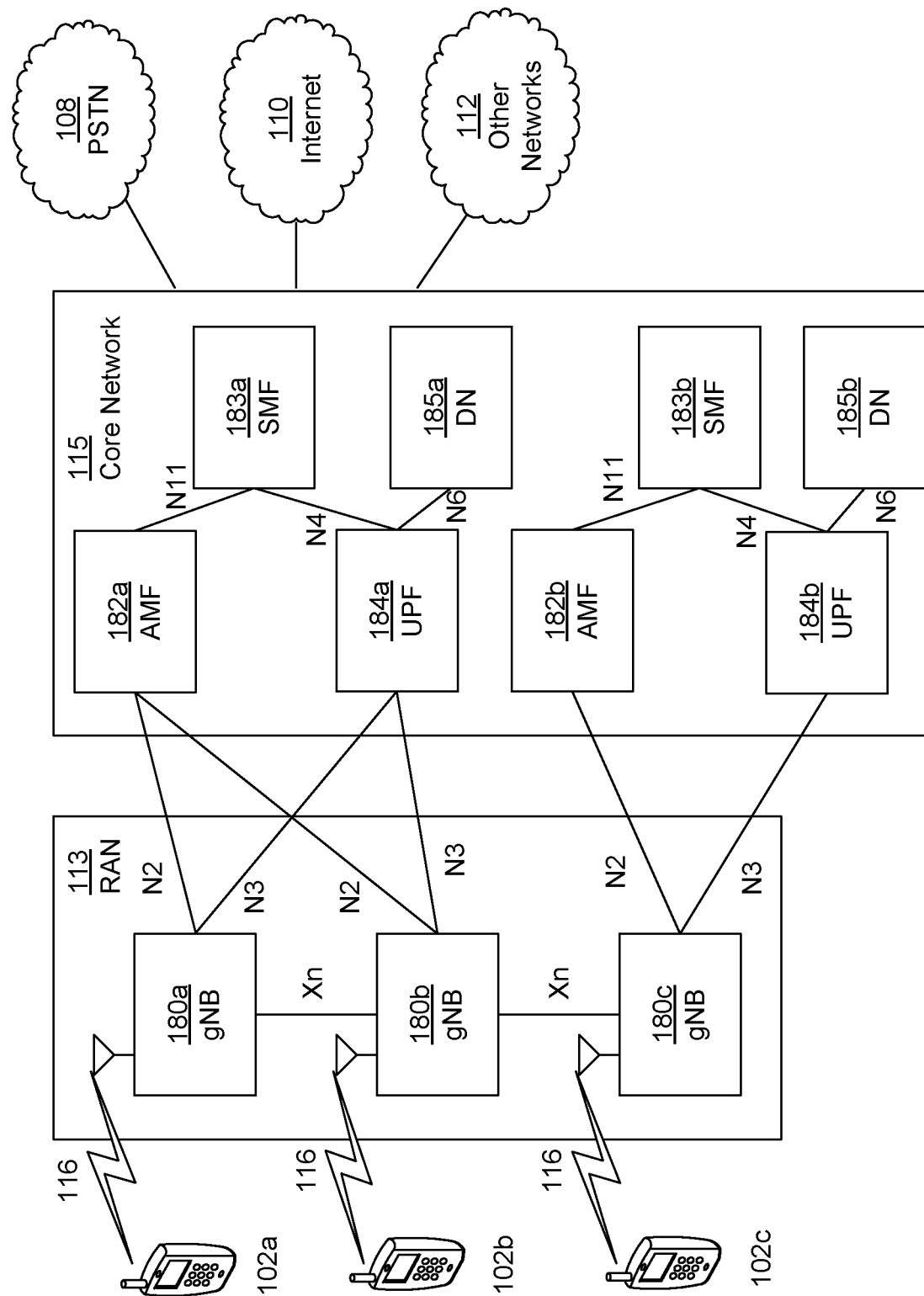
FIG. 1D is a system diagram illustrating a further example RAN and a further example CN that may be used within the communications system illustrated in FIG. 1A according to an example.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIG. 1A-D, and the corresponding description of FIG. 20 A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As the operating carrier frequency of a system increases, path loss may become a limitation in determining a sufficient coverage area. Transmission in millimeter wave systems may suffer from non-line-of-sight losses, e.g., diffraction loss, penetration loss, oxygen absorption loss, foliage loss, etc. A base station and a wireless transmit/receive unit (WTRU), for example during initial access, may need to overcome these path losses and discover each other. Utilizing dozens or even hundreds of antenna elements to generate a beam formed signal may be used to compensate for path loss by providing significant beam forming gain. Beamforming techniques may include digital, analog, and hybrid beamforming.

A basic multiple access scheme is orthogonal for downlink and uplink data transmissions (e.g., time and frequency physical resources of different users are not overlapped). Non-orthogonal multiple-access (NOMA) schemes may be used (e.g., for downlink multi-user superposition transmission (MUST) and new radio (NR) or 5G transmission).

NOMA schemes may be utilized to improve uplink (UL) link-level sum throughput and/or overloading capability, as well as system capacity enhancement (e.g., supported packet arrival rate at a given system outage). NR may use UL non-orthogonal multiple access at least for massive machine type communications (mMTC).

NOMA schemes may result in interference between various transmissions that may use overlapping resources. The use of overlapping resources, which may result in interference may be more noticeable as the system load increases. To combat the interference between non-orthogonal transmissions, transmitter side schemes such as spreading (linear or non-linear, with or without sparseness) and/or interleaving may be used to improve the performance and ease the burden of receivers.

Non-orthogonal transmission may be used for grant-based transmission and/or grant-free transmission. Non-orthogonal multiple access (e.g., when enabling grant-free transmission) may be used for a variety of use cases or deployment scenarios, including for example, enhanced Mobile Broadband (eMBB), Ultra-Reliable Low-Latency Communications (URLLC), massive Machine Type Communications (mMTC), etc.

Cellular systems may support higher data rates, lower latency, and massive connectivity. For example, cellular systems may support eMBB communications, URLLC, and mMTC, along with example usage scenarios and desirable radio access capabilities. With a broad range of applications and usage scenarios, radio access capabilities may differ across the range.

At least some multiple access schemes used in wireless cellular communication systems may assign time/frequency/spatial resources such that each user signal does not interfere with other users' signals. This type of access may be referred to as Orthogonal Multiple Access (OMA), where multiplexing the users on orthogonal resources may be performed in the time domain (TDM), in the frequency domain (FDM), and/or in the spatial domain (SDM).

Figure 2:
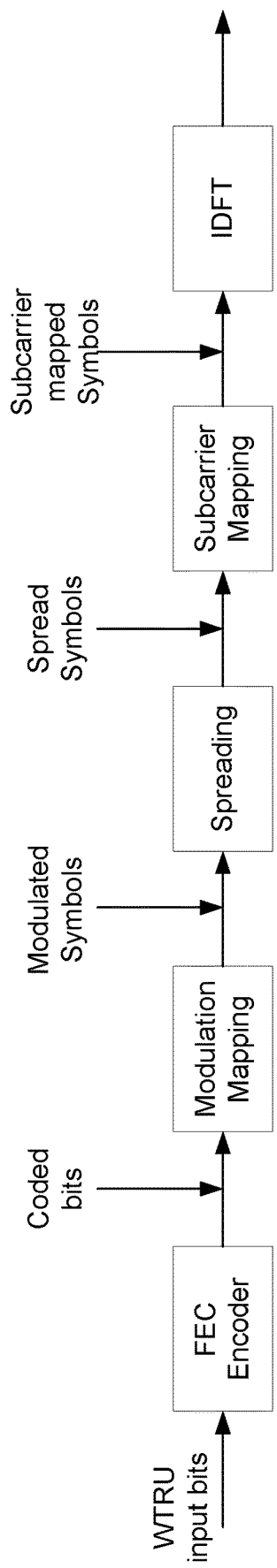
FIG. 2 is an example of a block diagram of a transmitter for code-domain based non-orthogonal multiple access (NOMA) transmission schemes.

NOMA schemes may be used in wireless communication systems that may provide massive connectivity and/or may require high spectral efficiency. A NOMA scheme may multiplex users in the code-domain. Different users may be assigned different spreading codes. The users may be multiplexed over the same time-frequency resources. FIG. 2 illustrates an exemplary block diagram of a transmitter for a code-domain based NOMA scheme. For certain NOMA schemes, the spreading sequences may be short. For example, the spreading sequences may consist of four to eight samples.

2-step RACH (or 2-step random access channel (RACH) procedure) may comprise a message A and a message B. A WTRU may send a message A to a gNB or a network in an uplink (UL). A WTRU may receive a message B from a gNB or a network in a downlink (DL). 2-step RACH, as described herein, may be utilized for NOMA transmission. 2-step RACH may be utilized for non-NOMA transmissions. Implementations as described herein may be applied to 2-step RACH whether or not 2-step RACH is utilized for NOMA.

NOMA or 2-step RACH may be used for URLLC, mMTC and eMBB. Different design targets may be required for different use cases and/or scenarios. For example, design targets for ULRRC may focus on low latency and/or high reliability. Design targets for mMTC may focus on a large number of connections and/or coverage for a large number of devices. Design targets for eMBB may focus on spectrum efficiency and/or throughput enhancement.

When a NOMA system or a 2-step RACH system is designed for each of these use cases and/or scenarios, scheduling, initial transmission and retransmission may be considered. A NOMA system or a 2-step RACH system may experience multiple access (MA) collisions. MA collisions may occur when multiple WTRUs select the same resource, for example, the same MA signature and/or the same demodulation reference signal (DMRS). In the case of collision, a gNB may not be able to detect and/or differentiate a first WTRU from a second WTRU.

A WTRU may identify itself during the reception of a signal from a gNB to address high interference from other WTRUs (e.g., using a NOMA identification). WTRUs may not be able to distinguish between each other in case of collision. Resolution of collision is considered for NOMA performance. Performance of NOMA (re)-transmission may be considered for different uses cases and scenarios.

Implementations associated with access, collision handling, and resolution for NOMA or 2-step RACH are described. When a plurality of WTRUs select the same MA signature or the same DMRS, collision may occur, e.g., during NOMA transmission by the WTRUs. Data belonging to one or more of the WTRUs involved in a collision may be decodable. For example, when a WTRU receives a response (e.g., an ACK) from a gNB, the WTRU may determine whether the response (e.g., the ACK from the gNB) is intended for the WTRU. In examples, the WTRU may transmit data including a supplemental ID (e.g., a NOMA ID) during the WTRU's initial transmission or the WTRU's retransmission. The gNB may send a response signal to the WTRU. The response signal may be a control signal or an ACK. The response signal may include or embed a supplemental ID that may be independent of an MA signature ID or a DMRS ID. The WTRU may receive the ACK and determine whether the embedded supplemental ID matches the WTRU ID. If the WTRU determines there is a match, the WTRU may continue processing (e.g., decoding and/or saving) the received data. If the WTRU does not determine a match, the WTRU may discard the received response signal from the gNB comprising the data. A WTRU may retransmit the original data. A WTRU may transmit new data.

The supplemental ID may be related to an MA signature index, a DMRS index, or an index that is different and independent of the MA signature index and/or the DMRS index. NOMA (or 2-step RACH) collision may be mitigated or resolved as long as the WTRUs do not select the same MA signature and/or the same DMRS at the same time (e.g., when the supplemental ID is related to an MA signature index or a DMRS index). NOMA (or 2-step RACH) collision may be resolved (e.g., if supplemental ID is included in the transmission from WTRU and/or in a response from gNB). This may be at the cost of additional signaling (e.g., signaling or bits to carry supplemental ID). For example, NOMA collision may be resolved at the cost of additional signaling when the supplemental ID is different and independent of an MA signature index and/or an DMRS index (e.g., multiple WTRUs selecting the same MA signature and DMRS at the same time).

A supplemental ID may be a cell radio network temporary identifier (C-RNTI), an international mobile subscriber identity (IMSI), a temporary mobile subscriber identity, or other ID that can serve the same or similar purpose, or the like. When a supplemental ID is used, an MA signature index and an DMRS index may or may not be linked with a different supplemental ID such that if a plurality of WTRUs select the same MA signature and/or DMRS, the WTRUs can still be distinguished using the selected supplemental ID.

A WTRU may be identified by one of more of the following, an MA signature index, a DMRS index, and/or a supplemental ID. A supplemental ID may be used for collision handling and/or collision resolution. A WTRU identity may include one or more of three components: an MA Signature ID, a DMRS ID, and/or a supplemental ID for NOMA or 2-step RACH operation. Table 1 illustrates an example of a WTRU ID #w comprising an MA Signature ID #x, a DMRS ID #y, and a supplemental ID #z.

TABLE 1

| WTRU Identity | MA Signature ID | DMRS ID | Supplemental ID |
|---|---|---|---|
| NOMA ID #w | MA Signature Index #x | DMRS Index #y | Supplemental ID #z |

A NOMA ID (or a 2-step RACH ID) may be used to identify a WTRU. A gNB may (e.g., blindly) detect and/or decode a WTRU identity via the one or more of the three WTRU identity components. If one of the WTRU identity components is obtained and detected, a WTRU may be identified. For example, a WTRU may process a DMRS index first, since the DMRS index may be used for identifying a WTRU and may be used for measurement, energy detection and channel estimation. If the WTRU is identified, the data associated with the WTRU may be decoded. After decoding the WTRU data, the WTRU data and the MA signature may be obtained and may become available. A supplemental ID (and/or an MA signature index, and/or a DMRS index) may be included in a response from a gNB to a WTRU. If a supplemental ID (and/or an MA signature index, and/or a DMRS index) is included in the response from a gNB to a WTRU, the supplemental ID (and/or an MA signature index, and/or a DMRS index) may be obtained. The supplemental ID may become available to a WRTU, for example, after a response from a gNB is detected and/or decoded. A WTRU may receive a response from a gNB after n+K time units from transmission of data from the WTRU at time n. K time units may lapse between a transmission of data from a WTRU and the WTRU's reception of a response from a gNB. There may be K time units between a transmission of data from a WTRU and a transmission of a response from a gNB. K time units may be K symbols (e.g., OFDM symbols), K mini-slots, K non-slots, K slots, K subframes, K frames, etc. K may be 0 (e.g., same slot operation) or non-zero (e.g., cross-slot operation). A K non-slot may include X symbols (e.g., OFDM symbols). X may be values (e.g., X=1, 2, 4, 7). X may be any value between 0 and 14. X may be other values. A WTRU may have a specific time (one or multiple times) to detect and/or decode a response from a gNB. A WTRU may have a window or duration to detect and/or decode a response from a gNB. The specific time (one or multiple times) to detect and/or decode the response from the gNB may be indicated, configured, or predetermined. The window or duration to detect and/or decode the response from a gNB may be indicated, configured, or predetermined. The specific time (one or multiple times) to detect and/or decode a response may be used, and a WTRU may fall back to a window or a duration-based approach or vice versa. A hybrid or combination of a specific time (one or multiple times) and window and/or duration may be used. An offset may be used in combination with a specific time (one or multiple times), a window, or a duration. A confirmation method may be performed such that an MA signature and a DMRS index may be compared. A gNB may confirm that the decoded data belongs to a desired WTRU.

The use of a supplemental ID may depend on a use case and/or scenario. For example, the supplemental ID may be included for NOMA transmission in URLLC and/or eMBB case(s) but may or may not be included for NOMA transmission in mMTC case. A first WTRU may select the same MA signature as a second WTRU, but the first WTRU may select a different DMRS than the second WTRU. When the first WTRU selects the same MA signature as the second WTRU, but a different DMRS, the WTRU data associated with the first WTRU may be decodable, for example, even if an MA signature collision occurs between the first WTRU and the second WTRU. A DMRS index may be used as the WTRU ID, for example, for UL NOMA transmission. The DMRS index may be embedded in a control signal or channel, data signal or channel, control/data signal or channel, or a feedback signal or channel (e.g., downlink control information (DCI), physical downlink control channel (PDCCH), physical downlink shared channel (PDSCH) or ACK/NACK). The DMRS index may be embedded in a signal or channel, e.g., Message B, when 2-step RACH is utilized.

An echo back MA signature ID may be used. A WTRU may receive a control signal or channel, data signal or channel, control/data signal or channel, or a feedback signal or channel (e.g., DCI, PDCCH, PDSCH or ACK/NACK). MA signature ID may be transmitted in a message A, for example, in 2-step RACH. An echo back MA signature ID in a message B may be used. A WTRU may receive a control signal or channel, data signal or channel, control/data signal or channel, or a feedback signal or channel e.g., message B, when 2-step RACH is utilized. The WTRU may determine whether the included or embedded MA signature ID matches the WTRU's own selected or indicated MA signature ID. If a match is determined, the WTRU may continue processing the received data. If a match is not determined, the WTRU may discard the received data. The supplemental ID may or may not be used. If the supplemental ID is included, the WTRU may use the supplemental ID (e.g., for improved reliability or confirmation).

An echo back DMRS ID may be used. A WTRU may receive a control signal or channel, data signal or channel, control/data signal or channel, or a feedback signal or channel (e.g., DCI, PDCCH, PDSCH or ACK/NACK). DMRS ID may be transmitted in a message A in 2-step RACH. An echo back DMRS ID may be used. A WTRU may receive a control signal or channel, data signal or channel, control/data signal or channel, or a feedback signal or channel, e.g., a message B, when 2-step RACH is used. The WTRU may determine whether the included or embedded DMRS ID matches the WTRU's own selected or indicated DMRS ID. If a match is determined, the WTRU may continue processing the received data. If a match is not determined, the WTRU may discard the received data. The supplemental ID may or may not be used. If the supplemental ID is included, the WTRU may use the supplemental ID to confirm the match.

An echo back identification may be used which may use an MA Signature ID and a DMRS ID in an echo signal or channel. A WTRU may receive a control signal or channel, data signal or channel, control/data signal or channel, or a feedback signal or channel (e.g., DCI, PDCCH, PDSCH or ACK/NACK). MAS ID and DMRS ID may be transmitted in a message A in 2-step RACH. An echo back MAS ID and DMRS ID may be used. A WTRU may receive a control signal or channel, data signal or channel, control/data signal or channel, or a feedback signal or channel, e.g., a message B, when 2-step RACH is used. The WTRU may determine whether the included or embedded MA signature ID and DMRS ID match the WTRU's own selected or indicated MA signature ID and/or DMRS ID. If a match is determined, the WTRU may continue processing the received data. If a match is not determined, the WTRU may discard the received data (or may store the data for further processing, e.g., soft combining). The supplemental ID may or may not be used. If the supplemental ID is included, the WTRU may use the supplemental ID to confirm the match.

An echo back NOMA ID or supplemental ID may be used. A NOMA ID or a supplemental ID may be included in an echo signal or channel. A WTRU may include a NOMA ID (or a supplemental ID or a WTRU ID) as part of the data payload or the NOMA ID (or a supplemental ID or a WTRU ID) may be implicitly or explicitly transmitted (e.g., during the transmission from the WTRU). Control/data channel or feedback signal may echo back a NOMA ID. A (e.g., special) control/data channel or feedback signal for NOMA may carry the NOMA ID. A control/data channel and/or feedback signal may echo back a WTRU ID (e.g., NOMA ID) for example where a WTRU ID may be carried in a NOMA (e.g., special) control and/or data channel (e.g., NM-PDCCH or NM-PDSCH). For example, a control signal or channel, data signal or channel, control/data signal or channel, or a feedback signal or channel (e.g., DCI, PDCCH, PDSCH or ACK/NACK) may carry a NOMA ID (or a supplemental ID or a WTRU ID).

An echo back NOMA ID or supplemental ID in a message B may be used, e.g., when 2-step RACH is used. A NOMA ID or a supplemental ID may be included in an echo signal or channel such as a message B in 2-step RACH. A WTRU may include a NOMA ID (or a supplemental ID or a WTRU ID) as part of a message A in 2-step RACH. A NOMA ID (or a supplemental ID or a WTRU ID) may be implicitly or explicitly transmitted during a 2-step RACH transmission from the WTRU. Control/data channel or feedback signal may echo back a NOMA ID. A control/data channel, feedback signal or a message B for 2-step RACH or NOMA may carry the NOMA ID. A control/data channel and/or feedback signal may echo back a WTRU ID (e.g., NOMA ID) for example where a WTRU ID may be carried in a 2-step RACH (e.g., a message A and a message B). For example, a control signal or channel, data signal or channel, control/data signal or channel, or a feedback signal or channel (e.g., a message A and/or a message B in 2-step RACH) may carry a WTRU ID, NOMA ID or a supplemental ID.

A WTRU may include one or more of the following: a NOMA ID, a supplemental ID, a WTRU ID, an MA signature ID, a DMRS ID, or the like in the transmission. The WTRU may receive a response from a gNB or a network including (e.g., same as transmitted) one or more of the following: a NOMA ID, a supplemental ID, a WTRU ID, an MA signature ID, a DMRS ID, or the like. The WTRU may compare the transmitted ID(s) and received ID(s) and process the data accordingly. WTRU may continue data processing, discard the received data, or store the received data for further processing, etc. (e.g., the WTRU may continue processing and/or store the data if the transmitted and received ID match, and the WTRU may discard the received data if the transmitted and received data do not match).

A WTRU may include one or more of the following in a message A of 2-step RACH: a NOMA ID, a supplemental ID, a WTRU ID, an MA signature ID, a DMRS ID, etc. The WTRU may receive a response from a gNB or a network including (e.g., same as transmitted) one or more of the following: a NOMA ID, a supplemental ID, a WTRU ID, an MA signature ID, a DMRS ID, etc. The WTRU may compare the transmitted ID(s) in message A and received ID(s) in message B and process the data accordingly. WTRU may continue data processing, discard the received data, or store the received data for further processing, etc. For example, the WTRU may continue processing and/or store the data if the transmitted ID in message A and received ID in message B match for 2-step RACH, and the WTRU may discard the received data if the transmitted ID In message A and received ID in message B do not match for 2-step RACH.

Collision mitigation techniques are provided, which may be used in wireless communications, e.g., for NOMA or 2-step RACH. For example, a fixed DMRS group and/or a fixed MA signature group may be used for NOMA transmission or 2-step RACH transmission. MA signatures may be divided or partitioned into two or multiple MA groups. For example, for two MA signature groups, an MA signature group A may include dedicated MA signatures and MA signature group B may include shared MA signatures. For example, the dedicated MA signatures belonging to the signature group A may be referred to as scheduled MA signatures, and the shared MA signatures belonging to the signature group B may be referred to as unscheduled MA signatures. An MA signature group and size may be predetermined. MA signature groups and their sizes may be fixed.

A WTRU may be assigned an MA signature for transmission and/or retransmission using group A or group B. A WTRU may be assigned a dedicated MA signature from group A to avoid collision (e.g., in order to reduce latency due to retransmission failure). A WTRU may be assigned a shared MA signature from group B (e.g., for initial transmission to increase trunking efficiency). MA signature groups may be used in different combinations of transmission and retransmission (e.g., to trade-off between trunking efficiency, latency, and performance for transmission and retransmission). MA signature groups may be used alternately for each retransmission. MA signature group A may be used for odd numbered transmission or retransmission while MA signature group B may be used for even numbered transmission or retransmission. MA signature group A may be used for the initial first K1 (re)-transmissions while MA signature group B may be used for the next K2 (re)-transmissions. Other combinations or utilizations of MA signature groups may be used. The association of MA signature groups and transmission/retransmission may be predetermined, configured, or indicated by signaling implicitly or explicitly, e.g., in a semi-static or dynamic fashion. For example, MA signature group information to be used for a NOMA transmission may be indicated to a WTRU via a NOMA configuration.

An MA signature may be allocated using criteria for the grouping of WTRUs in particular groups. For example, a CQI quality may be used as a metric for grouping WTRUs into high, medium, and low-quality groups. An MA signature may be associated with a particular CQI quality type.

DMRSs may be divided or partitioned into two or multiple groups. For example, for two DMRS groups, DMRS group A may include dedicated DMRSs. DMRS group B may include shared DMRSs. The DMRSs belonging to the DMRS group A may be referred to as scheduled DMRSs. The DMRSs belonging to the signature group B may be referred to as unscheduled DMRSs. A DMRS group and the group size may be predetermined. DMRS groups and their sizes may be fixed. The techniques described for MA signatures may be applied to DMRS, DMRS grouping, and utilization of DMRS grouping. DMRS may be a preamble when 2-step RACH is used. DMRS, in addition to preamble, may be used in 2-step RACH Variable and/or dynamic group DMRS and MA Signature for NOMA or 2-step RACH may be used. Fixed MA signature group and a group size of the MA signature group may achieve a (e.g., a certain level) trade-off between trunking efficiency and latency. A variable MA signature group and group size or dynamic MA signature group and group size may be used. Variable and/or dynamic MA signature group and group size of the MA signature group may achieve a (e.g., a higher level than the trade-off achieved by using a fixed MA signature group and group size) trade-off between trunking efficiency, performance, latency, and overhead. By using a variable or dynamic MA signature group and group size, the trunking efficiency may be enhanced and/or collision may be reduced (e.g., due to a larger group size for the shared MA signature group). Unused MA signatures may be transferred from one group to the other group (e.g., from MA signature group A to MA signature group B). The group size may change over time and may depend on the traffic or CQI quality. This may improve the resource utilization efficiency, enhance performance, and/or reduce the signal overhead. Due to variable or dynamic MA signature group and group size, WTRUs may determine the MA signature groups and group sizes (e.g., in order to correctly access the multiple access channel using NOMA). WTRUs may be indicated by a network or a gNB for the MA signature group and group size. Such indication may include one or more of the following: MA signatures (or MA signature index) in each group and/or MA signature size of each group. A WTRU may be indicated by a network, e.g., a gNB, for the already assigned, selected, or used MA signatures and/or DMRS indices (e.g., so that WTRUs may avoid using the same MA signatures and/or DMRS indices to mitigate the collision). Assigned, selected, or used MA signatures and/or DMRS indices may be broadcasted to certain WTRUs, a group of WTRUs, or all WTRUs. Assigned, selected, or used MA signatures and/or DMRS indices may be broadcasted using a group common control signal or channel (e.g., group common PDCCH (GC-PDCCH), common control signal or channel, e.g., RMSI, OSI, paging or the like). Assigned, selected, or used MA signatures and/or DMRS indices may be broadcasted using a reference signal or another signal or channel.

MA signatures in each group may be indicated by using a bitmap indication. For N MA signatures, N-bit bitmap indication may be used as follows:

Indicator a_n where n=0, 1, 2, . . . , N−1

Figure 3:
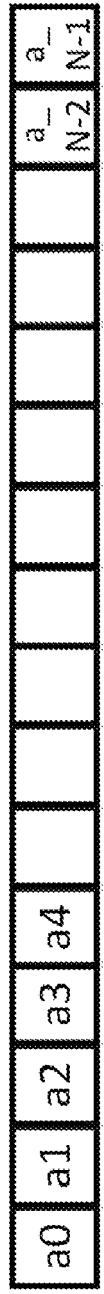
FIG. 3 is an example of a bitmap based variable or dynamic multiple access (MA) resource group (e.g., MA signature/demodulation reference signal (DMRS) group).

"0" may indicate that the MA belongs to MA group A or scheduled MA signature group "1" may indicate that the MA belongs to MA group B or unscheduled MA signature group The value of "0" and "1" may indicate which MA signatures are in the corresponding MA signature groups A or B. Examples are shown in FIGS. 3 and 4. FIG. 3 illustrates a bitmap based variable or dynamic MA group (e.g., MA signature/DMRS group). Each of the bits (e.g., a0, a1, . . . , aN−1) may indicate the group an MA signature may belong to. FIG. 4 illustrates an example of a bitmap based variable or dynamic MA group (e.g., MA signature/DMRS group). As illustrated in FIG. 4, the MA signature represented by index 0 belongs to Group A, whereas the MA signature represented by index 1 belongs to Group B.

A WTRU may receive an N-bitmap indication from a wireless communications network entity (e.g., a gNB). A WTRU may check the received N-bit bitmap indication (e.g., as illustrated in FIG. 4) to determine the MA signature groups and the MA signatures (or MA signature indices) that belong to each group. A WTRU may be instructed by the wireless communications network entity not to select the MA signature from the dedicated MA signature group (e.g., MA signature group A or scheduled MA signature group) (e.g., to avoid the collision with dedicated MA signatures). A WTRU may be instructed by the wireless communications network to use the MA signature from the dedicated MA signature group (e.g., MA signature group A or scheduled MA signature group) (e.g., to avoid the collision with shared MA signatures). A WTRU may be instructed by the wireless communications network to use the assigned MA signatures (e.g., based on an indication, signaling and/or scheduling grant). A WTRU may be instructed by the wireless communications network entity to select the MA signature from the shared MA signature group (e.g., MA signature group B or unscheduled MA signature group). The shared MA signature group may include (e.g., all the remaining) MA signatures that are not assigned as dedicated MA signature to WTRUs (e.g., via some indication, signaling and/or scheduling grant).

Figure 5:
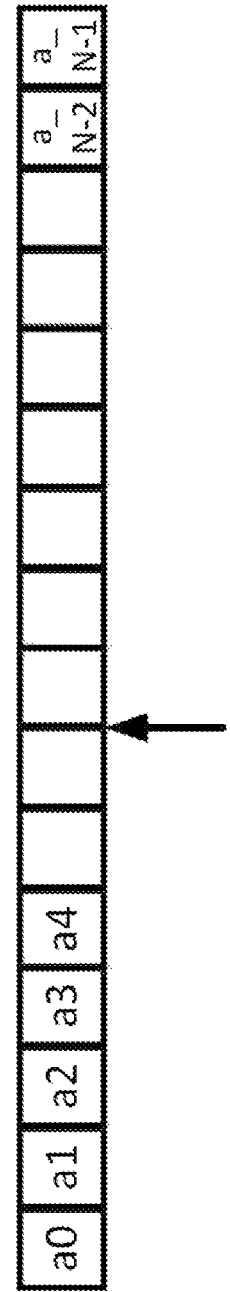
FIG. 5 is an example of a binary threshold based variable or dynamic MA resource group (e.g., MA signature/DMRS group).

MA signatures in each group may be indicated by a binary threshold. For example, a wireless communications network entity may indicate, to a WTRU, MA signatures belonging to each group via a binary threshold vale. N MA signatures (e.g., their indices) may be predetermined in an order (e.g., ascending order, descending order, mixed, etc.) FIG. 5 illustrates an example of a binary threshold based variable or dynamic MA group (MA signature/DMRS group). As illustrated in FIG. 5, for example, a binary threshold may be indicated dynamically via a control channel (e.g., a group-common PDCCH (GC-PDCCH)). An MA signature index that is less than or equal to the binary threshold may belong to MA signature group A or scheduled MA signature group. An MA signature index that is larger than the binary threshold may belong to MA signature group B or unscheduled MA signature group. A log 2(N) bits may be used to indicate this binary threshold. Using a binary threshold based may reduce signaling overhead and/or restrict flexibility for multiple access (e.g., as compared to N bits in a bitmap-based indication).

Figure 6:
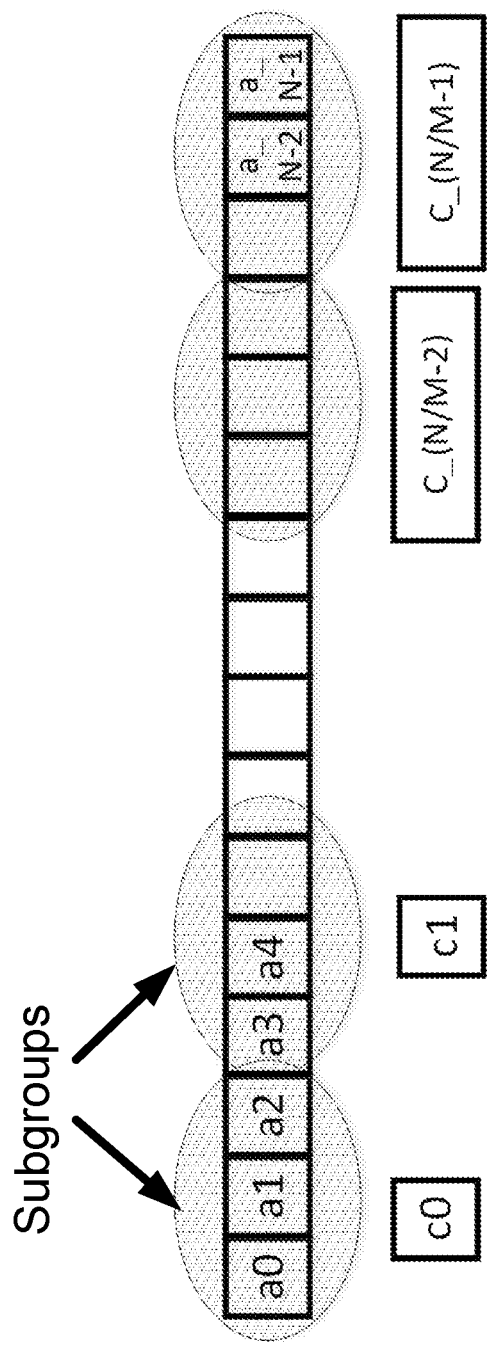
FIG. 6 is an example of a subgrouping-based variable or dynamic MA resource group (e.g., MA signature/DMRS group).

A second-tier subgrouping for MA group (e.g., an MA signature group, a DMRS group, or both) may be used. Subgroup-based or subgrouping-based bitmap or subgrouping-based technique may be used (e.g., to reduce signaling overhead, as for example versus a bitmap-based technique without grouping/subgrouping). FIG. 6 illustrates an example of subgrouping-based technique. For example, as illustrated in FIG. 6, if each subgroup includes signals or indices, e.g., M MA signatures or M DMRSs, then N/M bits may be used to indicate the variable or dynamic MA grouping with subgrouping. As illustrated in FIG. 6, the signaling overhead of subgrouping-based technique for MA group indication may be reduced by M times (e.g., as compared to N bits in a bitmap-based technique).

In a subgrouping-based technique, each subgroup may be represented by an indicator $c\_n$ where $n=0, 1, 2, \ldots, N/M-1$ may be used.

"0" may indicate MA group A or scheduled MA signature group

"1" may indicate MA group B or unscheduled MA signature group

The positions of "0" and "1" may indicate which MA signatures are in the corresponding MA signature groups A or B.

MA signature group indication may be broadcasted to a group of WTRUs or to all WTRUs using, for example, a group-common PDCCH (GC-PDCCH), a common control channel, or the like (e.g., new radio physical broadcast channel (NR-PBCH), remaining minimum system information (RMSI), other system information (OSI), paging, random access channel (RACH) random access response (RAR) or message 4, or the like). For example, in radio resource control (RRC) connected mode, GC-PDCCH may be used to broadcast the variable or dynamic MA signature groups to a group of WTRUs or (e.g., all) WTRUs. In idle mode, RMSI or OSI may be used to broadcast the variable or dynamic MA signature groups to a group of WTRUs or (e.g., all) WTRUs. MA signature group indication may be beam-specific or synchronization signal (SS) block specific or SS/physical broadcast channel (PBCH) block specific. MA signature group indication may be carrier-specific (e.g., UL or SUL-specific), frequency-specific, transmission point (TRP)-specific, and/or cell-specific. The implementations as described herein may be applied to NOMA or 2-step RACH.

DMRS may use an approach similar to that used for MA by using variable DMRS group and group size or dynamic DMRS group and group size. The trunking efficiency for DMRS (e.g., variable DMRS group and group size or dynamic DMRS group and group size) can be enhanced and/or collision can be reduced due to larger group size for shared DMRS group (e.g., because non-used DMRSs may be transferred from one group to the other group, e.g., from DMRS group A to group B). For example, for a larger group size than the ones for which the resource information is indicated by using a bitmap, the resource information may be indicated using a subgroup-based or subgrouping-based bitmap. The techniques described for MA signatures can be applied to DMRS for variable or dynamic DMRS group, group size, and/or utilization of DMRS.

Figure 7:
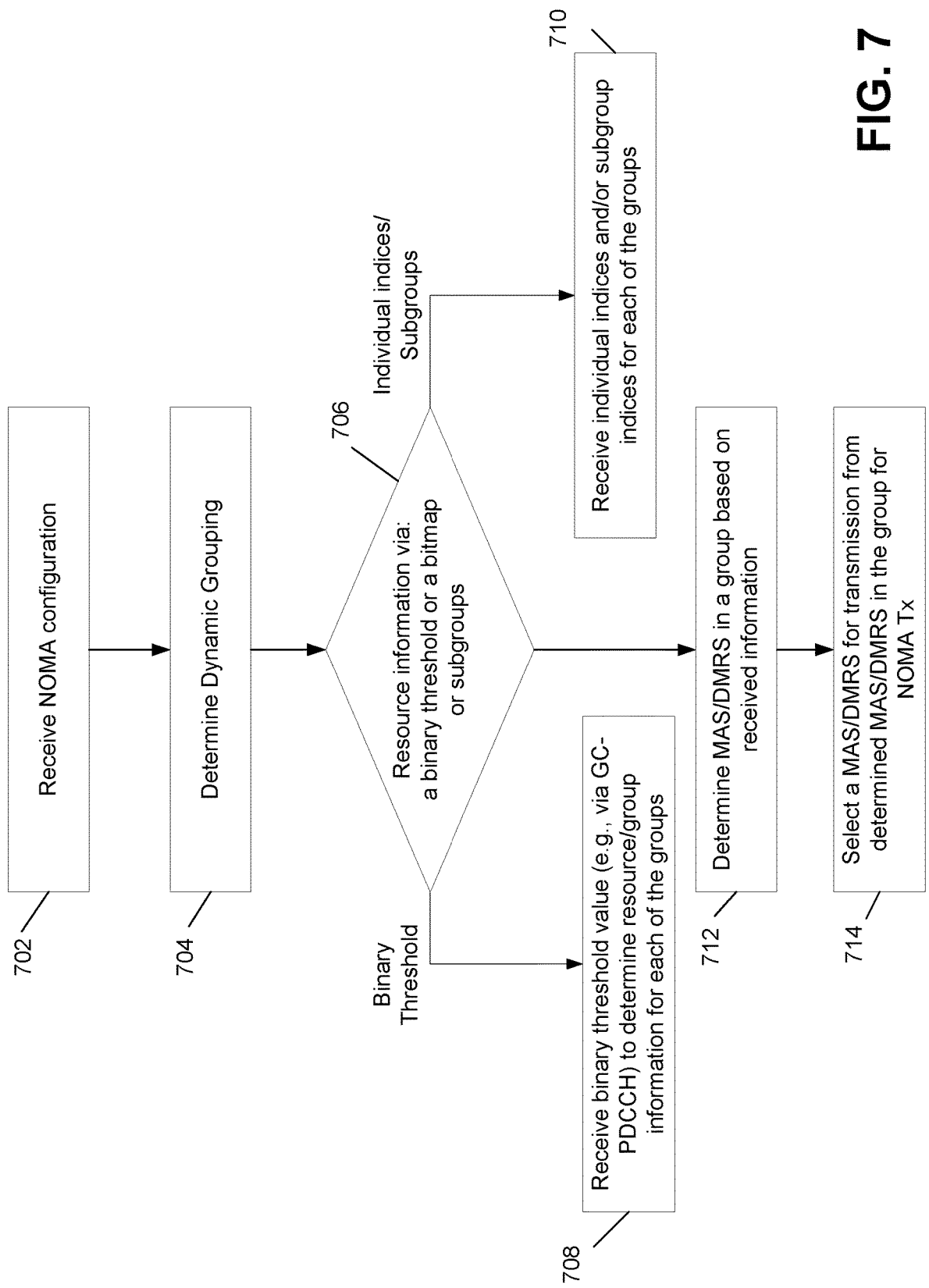
FIG. 7 illustrates an exemplary flow chart illustrating an example method that may be performed by a WTRU to select resources for a NOMA transmission or a 2-step RACH transmission.

FIG. 7 illustrates an exemplary flow chart illustrating an example method that may be performed by a WTRU to select resources for a NOMA transmission or a 2-step RACH transmission. As is illustrated in FIG. 7, at 702, a WTRU may receive NOMA configuration from a network entity (e.g., a 5G network entity). The NOMA configuration may include information about MAS/DMRS resource groups. The MAS/DMRS information may be received by the WTRU, e.g., via a group common physical downlink control channel (GC-PDCCH). The WTRU may also receive group size information corresponding to a resource group from the network entity.

At 704, the WTRU may determine that MAS/DMRS grouping is dynamic. At 706, the WTRU may determine whether the MAS/DMRS resource information is received via a binary threshold, a bitmap, or a plurality of subgroups.

In case the MAS/DMRS resource information is received via a binary threshold, at 708, the WTRU may receive resource information for each of the groups as illustrated in FIG. 5. In case the MAS/DMRS resource information is received via a bitmap indication, at 710, the WTRU, may receive MAS/DMRS resource information as illustrated in FIG. 3 and FIG. 4. In case the MAS/DMRS resource information is received via a subgroup-based scheme, at 710, the WTRU, may receive MAS/DMRS resource information as illustrated in FIG. 6. For example, the MAS/DMRS resource information may be received via a subgroup-based scheme for group sizes that are larger than the resource group size when the MAS/DMRS resource information is indicated via a bitmap indication. The WTRU may use the received group size to determine the manner in which the MAS/DMRS resource information may be received from a network entity.

At 712, the WTRU may determine MAS/DMRS that may belong to a group (e.g., Group B or unscheduled MA signature group). The WTRU may determine the MAS/DMRS information associated with the group from the received MAS/DMRS resource information.

At 714, the WTRU may select an MAS/a DMRS resource for transmission from the determined MAS/DMRS resources that may belong to the group. The WTRU may send a NOMA transmission on the selected MAS/DMRS resource.

An initial transmission and/or a retransmission for NOMA or 2-step RACH may be used. A NOMA retransmission may occur in preconfigured NOMA transmission occasions with periodicity and/or offset (e.g., time, frequency, etc.) for NOMA. A retransmission may occur between two logically continuous NOMA transmission occasions. Additional resources may be used. Additional resources may be indicated to a WTRU for retransmission. For example, the resources may include one or more of time, frequency, code, power, etc.

Dedicated or shared resources (e.g., time, frequency, code, power, etc.) for the retransmission may be indicated to a WTRU. The dedicated or shared resources may be indicated to a WTRU via system information (e.g., NR-PBCH, RMSI, OSI), Paging, RAR (e.g., RACH RAR), message 4, control channel (NR-PDCCH, GC-PDCCH), downlink control information (DCI), common control, or the like.

For initial transmission, grant-free and/or grant-based OMA or NOMA resources may be used. Transmission on grant-free and grant-based resources may be used to achieve diversity and/or reliability (e.g., in case of ultra-reliable low-latency communications (URLLC)). Multiple grant-free or grant-based resources may be selected for transmission. A WTRU may select grant-based resource (e.g., for enhanced reliability at the cost of latency). A WTRU may select grant-free resource (e.g., for reduced latency at the cost of performance). A WTRU may (e.g., autonomously) select grant-free or grant-based resources according to a set of parameters that may be predetermined, configured, and/or indicated. A WTRU may (e.g., autonomously) select grant-free or grant-based resources according to latency requirements and/or service types (e.g., select grant-free resources for URLLC or grant-based resources for eMBB).

Retransmission with grant-free and/or grant-based on OMA or NOMA resources or 2-step RACH resources may be used. A WTRU may be (re)-assigned with DMRS, an MA signature, and/or the same, different, or additional resource(s). A WTRU may be (re)-configured or indicated using frequency hopping pattern across transmission and/or retransmission. A WTRU may be (re)-assigned with a spread factor and/or codeword length for MA signature. A WTRU may be (re)-assigned with a same or different redundancy version (RV) and/or a same or different repetition factor K. A WTRU may be indicated to use: (i) a same or different NOMA scheme; (ii) a same or different OMA or NOMA resource(s); (iii) a (e.g., a special) grant, a full grant or a partial grant (e.g., a WTRU may be indicated to use a full grant for OMA and a partial grant for NOMA); (iv) a same or different RNTI, C-RNTI, or special RNTI (e.g., NM-RNTI); (v) one or more BWPs for transmission and/or retransmission; (vi) for DCI (e.g., included in a DMRS field, an MA signature field or both, e.g., a 1-bit indicator may be used to indicate the field is intended for MA signature or DMRS index); (vii) using one or more supplemental uplinks (SULs); (viii) power boosting for DMRS, MA signature or both; and/or (ix) power control for DMRS, MA signature, or both.

Power control for MA signature, DMRS, or both may be indicated to a WTRU. A common power control command may be used for MA signature, DMRS, or both. Separate power control commands may be used for MA signature and DMRS (e.g., separately). Separate power control commands may be used for different MA signature groups and DMRS groups.

To support low latency and high reliability scenarios, the initial transmission and the retransmission may have low latency, high reliability, and/or high performance. Hybrid techniques or mixed techniques may be considered for NOMA (e.g., to achieve low latency and/or high performance). Grant-free resources may be used for initial transmission and grant-based resources may be used for retransmission (e.g., some retransmissions). Grant-free resources may be used for some retransmissions.

Based on an initial transmission for NOMA from a WTRU, a network entity may detect the WTRU, but may not be able to decode data from the WTRU, the network may neither detect the WTRU nor decode data associated with the WTRU. A NOMA retransmission may include a WTRU using the same DMRS and/or a reassigned MA signature, for example, if a WTRU can be detected, but the WTRU data cannot be decoded. A NOMA retransmission may include a WTRU reassigned for DMRS and/or MA signature (e.g., if neither a WTRU can be detected nor WTRU data can be decoded).

Implementations described herein may be applied to 2-step RACH whether or not 2-step RACH is used for NOMA. Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

Although the features and elements of the present invention are described in particular combinations, each feature or element may be used alone or in combination and without or without the other features and elements as described herein.

Although the techniques described herein consider New Radio (NR), 5G or LTE, LTE-A specific protocols, it is understood that the techniques described herein are not restricted to this scenario and are applicable to other wireless systems as well.

What is claimed:

1. A wireless transmit/receive unit (WTRU) comprising:
   a processor configured to at least:
   receive information indicating a plurality of sequence indices associated with a plurality of sequences to be used by the WTRU for a transmission;
   receive a threshold index, wherein the threshold index indicates that a first subset of the plurality of sequence indices that are lesser or equal to the threshold index belong to a first group of sequence indices and a second subset of the plurality of sequence indices that are greater than the threshold index belong to a second group of sequence indices;
   select, from the first group of sequence indices or the second group of sequence indices, a sequence index indicating a sequence to be sent in the transmission; and
   send the transmission, wherein the transmission comprises the sequence indicated by the selected sequence index.

2. The WTRU of claim 1, wherein the processor is further configured to:
   receive a group indication; and
   based on the group indication, select the first group of sequence indices or the second group of sequence indices.

3. The WTRU of claim 1, wherein the threshold index is received via a physical downlink control channel (PDCCH) transmission.

4. The WTRU of claim 2, wherein the group indication is a dynamic indication received via a grant or via signaling.

5. The WTRU of claim 1, wherein the sequence is a signature or a reference signal.

6. The WTRU of claim 5, wherein the signature is a multiple access (MA) signature and the reference signal is a demodulation reference signal (DMRS).

7. The WTRU of claim 1, wherein the plurality of sequence indices is received from a base station.

8. A method implemented by a wireless transmit/receive unit (WTRU), the method comprising:
   receiving information indicating a plurality of sequence indices associated with a plurality of sequences to be used by the WTRU for a transmission;
   receiving a threshold index, wherein the threshold index indicates that a first subset of the plurality of sequence indices that are lesser or equal to the threshold index belong to a first group of sequence indices and a second subset of the plurality of sequence indices that are greater than the threshold index belong to a second group of sequence indices;

selecting, from the first group of sequence indices or the second group of sequence indices, a sequence index indicating a sequence to be sent in the transmission; and sending the transmission, wherein the transmission comprises the sequence indicated by the selected sequence index.

9. The method of claim 8 further comprising:

receiving a group indication; and based on the group indication, selecting the first group of sequence indices or the second group of sequence indices.

10. The method of claim 8, wherein the threshold index is received via a physical downlink control channel (PDCCH) transmission.

11. The method of claim 9, wherein the group indication is a dynamic indication received via a grant or via signaling.

12. The method of claim 8, wherein the sequence is a signature or a reference signal.

13. The method of claim 12, wherein the signature is a multiple access (MA) signature and the reference signal is a demodulation reference signal (DMRS).

14. The method of claim 8, wherein the plurality of sequence indices is received from a base station.

\* \* \* \* \*